(12) United States Patent
Eisenbruk

(10) Patent No.: US 10,978,895 B2
(45) Date of Patent: Apr. 13, 2021

(54) BATTERY CHARGING, DISPENSING AND STORING DEVICE AND METHOD

(71) Applicant: Robert Eisenbruk, Montreal (CA)

(72) Inventor: Robert Eisenbruk, Montreal (CA)

(*) Notice: Subject to any disclaimer, the term of this patent is extended or adjusted under 35 U.S.C. 154(b) by 421 days.

(21) Appl. No.: 15/764,842

(22) PCT Filed: Sep. 30, 2016

(86) PCT No.: PCT/CA2016/051143
§ 371 (c)(1),
(2) Date: Mar. 29, 2018

(87) PCT Pub. No.: WO2017/054088
PCT Pub. Date: Apr. 6, 2017

(65) Prior Publication Data
US 2018/0351378 A1    Dec. 6, 2018

Related U.S. Application Data

(60) Provisional application No. 62/234,711, filed on Sep. 30, 2015.

(51) Int. Cl.
*H02J 7/00* (2006.01)
*H02J 13/00* (2006.01)

(52) U.S. Cl.
CPC .......... *H02J 7/0045* (2013.01); *H02J 7/0021* (2013.01); *H02J 7/0047* (2013.01); *H02J 13/0003* (2013.01); *H02J 7/0027* (2013.01)

(58) Field of Classification Search
CPC .................................................... H02J 7/0045

USPC ......................................................... 320/107
See application file for complete search history.

(56) References Cited

U.S. PATENT DOCUMENTS

| | | | | |
|---|---|---|---|---|
| 3,171,568 A * | 3/1965 | Robert | .................. | H01M 10/46 221/66 |
| 5,694,019 A * | 12/1997 | Uchida | .................. | H01M 10/46 320/106 |
| 6,184,655 B1 * | 2/2001 | Malackowski | ....... | H02J 7/0022 320/116 |
| 2003/0120380 A1 * | 6/2003 | Bean | ......................... | G07F 7/06 700/231 |
| 2013/0063073 A1 * | 3/2013 | Kawasaki | ............. | H02J 7/0027 320/101 |
| 2013/0320924 A1 * | 12/2013 | Merrill | .................. | H02J 7/0045 320/110 |
| 2015/0045947 A1 * | 2/2015 | Yau | ........................ | G07F 15/006 700/237 |

* cited by examiner

*Primary Examiner* — Jerry D Robbins
(74) *Attorney, Agent, or Firm* — Brouillette Legal Inc.; Robert Brouillette

(57) ABSTRACT

A battery charger adapted to simultaneously store, charge and dispense batteries. The battery charger is in an elongated form having a reservoir to store the battery in an upper portion and provides a mean to push the batteries from the reservoir toward charging station which are vertically aligned in a charging compartment connected to the reservoir by a passageway. When the push means is activated, a battery from the storing compartment is pushed in an uppermost charging station, pushing any battery present in the said uppermost charging station. When all charging stations contain a battery, the battery from the lowermost charging station is expelled or ejected from the said lowermost charging station.

22 Claims, 4 Drawing Sheets

BATTERY CHARGING, DISPENSING AND STORING DEVICE AND METHOD

CROSS-REFERENCE TO RELATED APPLICATIONS

The present patent application claims the benefits of priority of U.S. Patent Application No. 62/234,711, entitled "Battery Charging Dispensing and Storing Device and Method" and filed at the United States Patent and Trademark Office on Sep. 30, 2015, the content of which is included by reference.

FIELD OF THE INVENTION

The present invention generally relates to a battery charger for simultaneously charging a multiplicity of any round format of battery cells. More particularly, the present invention is adapted to store depleted batteries received in one way in and to dispense charged ones.

BACKGROUND OF THE INVENTION

Nowadays, many devices use a plurality of AA and AAA batteries. Typically, non-rechargeable batteries are used as such batteries are fully charged and ready to be used. However, non-rechargeable are generally used once and in many application only last one day or one session with the device. Rechargeable batteries are not used as they bring much inconvenient and hassles as the batteries must be rotated and charged in conventional battery chargers. This process generally comprises removing the charged batteries from the charger and replacing the said batteries with depleted one. Also, when many batteries are needed, many electrical outlets are used as chargers are typically configured to charge up to four batteries.

Conventionally, multi-cell charging devices, such as the battery charger disclosed in U.S. Pat. No. 3,171,568, have been proposed to dispose and charge batteries in row. Patent '568 discloses that the introduction of a depleted battery into the row at one side, automatically lead to the expenditure of a charged battery from the other side. Such charger doesn't allow storing of spent batteries without being charged which means a less efficient process of consuming energy.

A general prior art solution is to insert batteries into a charger using an horizontal feed without any restriction on the position or the introducing direction of the battery. Typically, such solution requires complex electronic circuitry to ensure that each battery is charging independently of its polarity.

Despite the previous use of different systems placed at the bottom of chargers to hold batteries and prevent them from falling out of the main body, there is still a need to improve the process of charging multiple batteries and to rotate the batteries in the charger during all the process.

SUMMARY OF THE INVENTION

The aforesaid and other objectives of the present invention are realized by generally providing a device allowing automatic rotation of the batteries when a depleted is inserted in a battery reservoir of the charging device. Such reservoir allowing to increase the number depleted batteries stored in the charging device.

The features of the present invention which are believed to be novel are set forth with particularity in the appended claims.

In one aspect of the invention, a battery charger adapted to simultaneously store and charge batteries is provided. The charger comprises an upstanding housing, the housing comprising an aperture adapted to receive batteries, a battery storing compartment in communication with the aperture, a charging compartment comprising a plurality of charging stations, the charging stations being side by side and being configured to provide current to a battery within the charging station, a guiding wall adapted to guide one or more batteries present in the charging stations to slide down along the charging compartment and a resilient member adapted to displace at least one battery present in the battery storing compartment to the charger compartment and to displace any battery present in the charger compartment to the next charging station and/or to the receiving portion. Each charging station is configured to provide a resilient force sufficient to hold a battery present in the charging station during the charging process and configured to release the battery when a battery present in the battery storing compartment is pushed toward an uppermost charging station by the resilient member.

The charging device may further comprise charging terminals adapted to provide current to the batteries and each charging station is configured to reinforce holding of batteries. The charging terminal may be made of conductive material and may be configured to provide a resilient force sufficient to hold batteries during the charging process but adapted to release the battery when a battery is pushed by the resilient member.

In another aspect of the invention, the storing compartment may comprise an upper portion and a lower portion, the upper portion being adapted to store a plurality of batteries and the lower portion being configured to receive only one battery.

In yet another aspect of the invention, the resilient member may comprise a handle attached to a spring, the housing being configured to receive the handle and to limit the vertical movement of the handle, the handle comprising a bottom portion adapted to push a batterying present in the storing compartment. The resilient member may further comprise a protrusion adapted to be received by guide rails of the housing.

In a further aspect of the invention, the housing may comprise a back wall, the back wall comprising a holding member in between two charging stations, the holding member being adapted to hold a battery within the charging station and to displace the battery toward the guiding wall when a downward force is apply on the said battery.

In another aspect of the invention, the charger may further comprisea communication means adapted to communicate with a network and a controller adapted to send status of the charging process to a client device in communication with the charger. The guiding wall may further comprise an aperture adapted to access the charging stations.

The present invention also provides a method for storing, charging and dispensing batteries. The method comprises inserting a battery to be charged in an aperture of a charging device, the aperture being in communication with a storing compartment, activating a resilient member of the charger to displace a battery present in the storing compartment to an upper most charging station of a charging compartment through a passage portion in-between the storing compartment and the charging compartment, the charging compartment comprising a plurality of charging stations being vertically aligned and providing a resilient force sufficient to hold a battery present in the charging station during the charging process and configured to release the battery when a battery present in the battery storing compartment is pushed by the resilient member, the resilient member being configured to provide a force sufficient to release all batteries present in the charging stations, and repeating step b) until a battery present in a lowermost charging station is ejected from the lowermost charging station.

In yet another aspect of the invention, the resilient member may comprise a handle, the activating of the resilient member is done by downwardly pushing the handle.

In a further aspect of the invention, the battery present in the lowermost charging station is ejected in a battery charger under the lowermost charging station.

The aperture for inserting batteries may be shaped as the type of battery to be inserted, the method further comprising aligning the battery with the shape of the aperture.

The method may also further comprise communicating status of the charging device to at least one device in communication with the charging device.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel battery charging, dispensing and storing device and method will be described hereinafter. Although the invention is described in terms of specific illustrative embodiment(s), it is to be understood that the embodiment(s) described herein are by way of example only and that the scope of the invention is not intended to be limited thereby.

Figure 1:
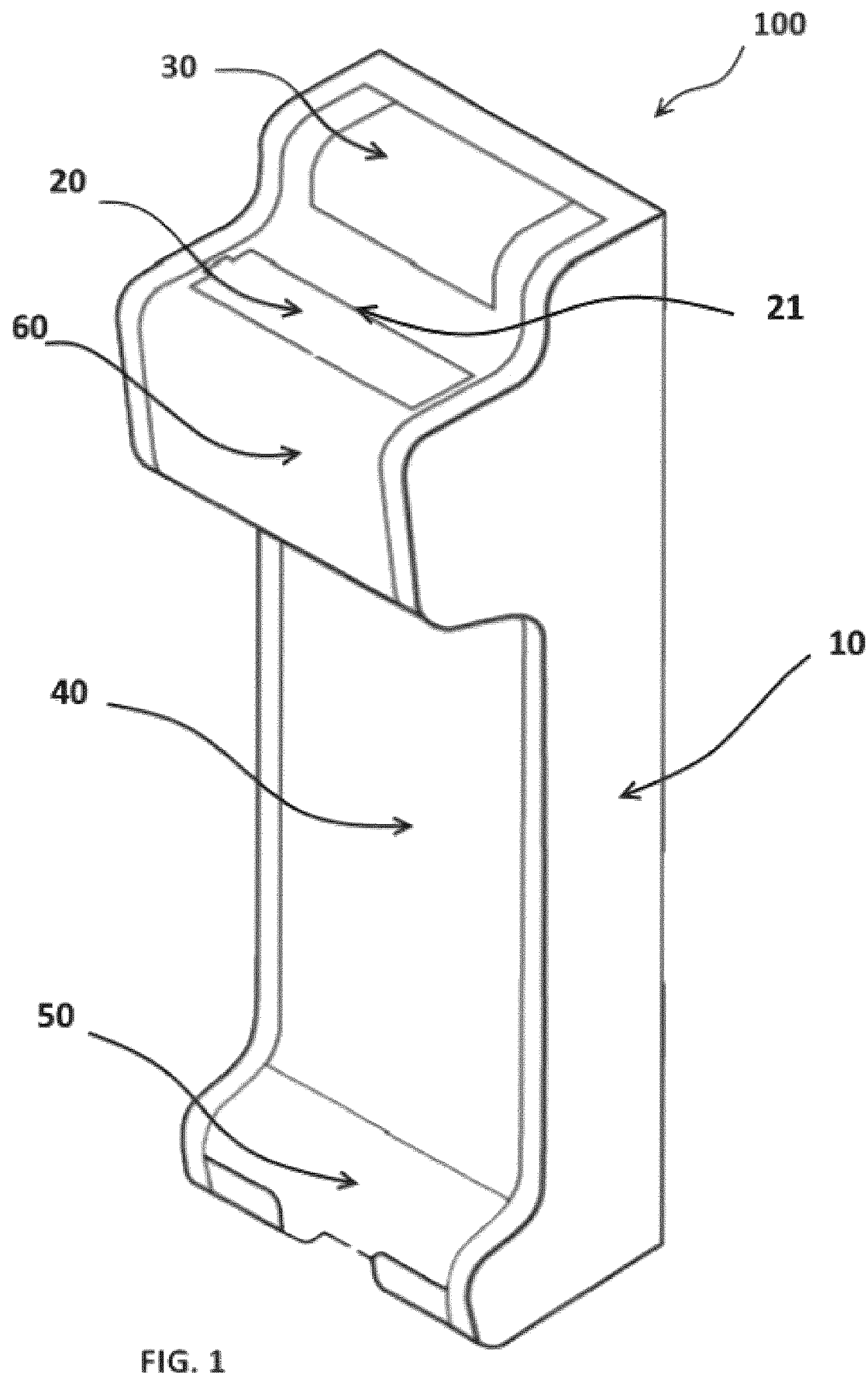
FIG. 1 is a perspective view of a battery charger device in accordance with the principles of the present invention.

Now referring to FIG. 1, a preferred embodiment of a battery charging, dispensing and storing device 100 is illustrated as perspective view. The charging device 100 comprises a housing 10 adapted to receive a plurality of batteries, an aperture 20 adapted to receive one or more batteries, a mean adapted to push/pull discharged batteries within a charging compartment, also referred to as guiding wall, 40 and/or to eject charged batteries from the charging compartment 40 and a receiving portion, also referred to as battery catcher, 50 adapted to receive ejected batteries, In a preferred embodiment, the housing 10 has an upstanding elongated shape, preferably a general rectangular form.

The housing 10 comprises a mean or mechanism adapted to push/pull discharged batteries within a charging compartment 40 and/or to eject charged batteries from the charging compartment 40 from an aperture 20. In a preferred embodiment, the mean for pushing batteries is a slider/feeder 30 used for pushing batteries down, generally one by one. In such an embodiment, the slider/feeder 30 is located higher than the charging compartment 40. Understandably, in other embodiment, the slider/feeder 30 could be adapted to pull the batteries inserted in an aperture 20.

Figure 4:
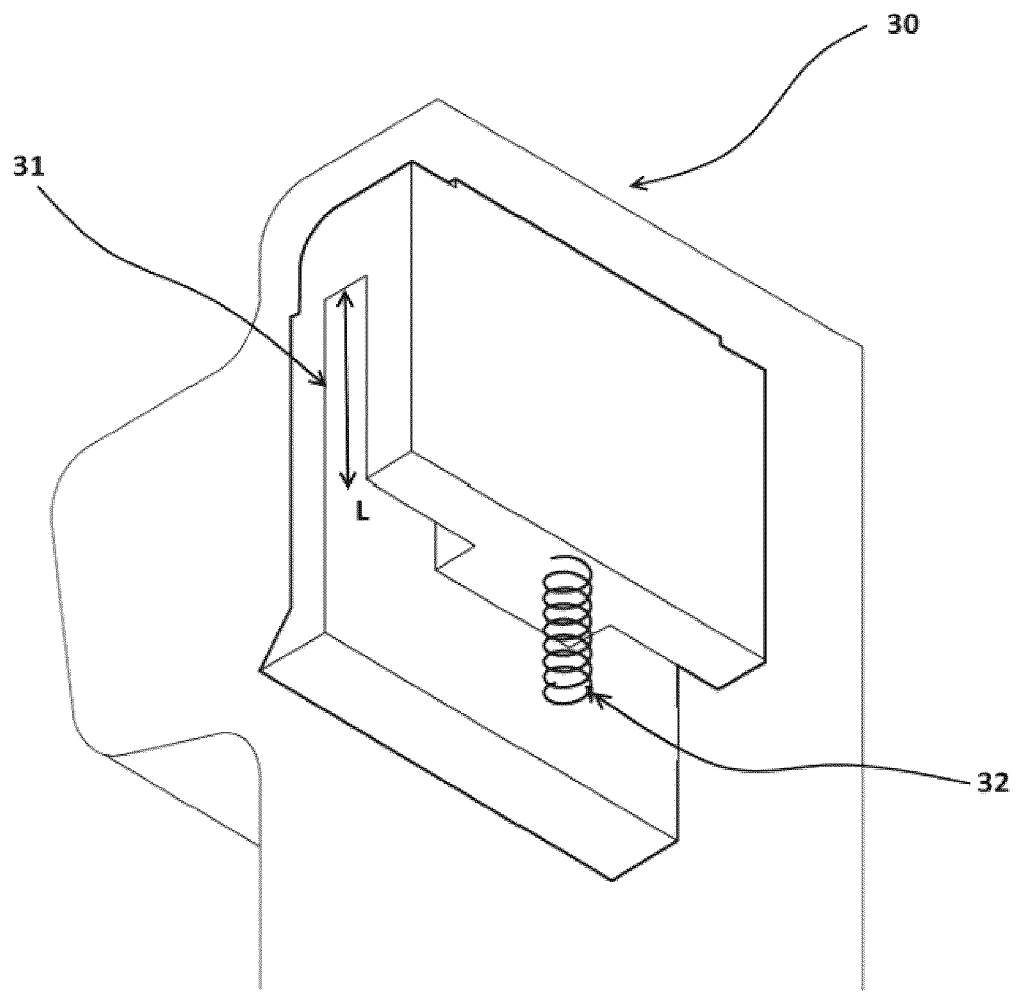
FIG. 4 is a perspective schematic inner view of the slider/feeder of the battery charger device of FIG. 1.

Now referring to FIG. 4, the mean to push discharged batteries 30 allows movement limited by a certain distance L allowing only a predetermined number of batteries to come out the battery catcher, also referred to as bottom shoot 50. In a preferred embodiment, the said movement of the slider 30 is guided by rails 31. A resilient member 32, such as but not limited to a spring, is located on the bottom portion of the slider 30. The resilient member 32 is adapted to allow the slider 30 to return to the standby position.

Referring back to FIG. 1, the housing 10 comprises a discharged batteries reservoir or tank 60 and a wall 41 typically located at the front of the housing. In a preferred embodiment, the reservoir 60 is formed by a forward offset of an upper portion of the housing 10.

Still referring to FIG. 1, in a preferred embodiment, the top of the tank 60 comprises the aperture 20 adapted to receive discharged batteries. In another embodiment, a door 21, such as a trap door, may cover the aperture to limit dust or other elements which could enter within the housing 10. In a further embodiment, the aperture 20 may be shaped as the type of battery to be inserted. As such, the shaped aperture 20 allows batteries to be inserted in one direction only, allowing each terminal of the batteries to be correctly aligned with the matching terminals of the charger. In embodiments having a trap door, the door 21 may comprise a resilient member, such as a spring not shown, adapted to control the return of the trap door after a battery is inserted within the aperture, also referred to as the filling shoot, 20.

In a preferred embodiment, the charging compartment 40 is adapted to guide the batteries to slide down along the charging compartment 40. In some embodiments, the charging compartment 40 may be made of transparent material for easier visual inspection. Typically, the bottom end 42 of the guiding wall is located just above the battery receiving portion or battery catcher 50.

In another embodiment, the guiding wall may comprise an aperture, not shown, allowing access to manually push the batteries of the charging compartment 40. In such an embodiment, the aperture may be used when all the batteries within the charging compartment 40 must be ejected (ex: for maintenance of the device or in the event of a defective battery).

The battery catcher 50 is adapted to receive the one or more charged batteries of the device 100. The one or more charged batteries may be dispensed each time the user presses the slider/feeder 30. In a preferred embodiment, the battery catcher 50 is adapted to hold up to two charged batteries. Understandably, in other embodiments, the battery catcher 50 may be configured to hold any number of charged batteries. For instance, the volume and the shape of the battery catcher 50 may be increased to receive more batteries. Typically, the battery catcher 50 comprises an open slot 51 for easy access to the user. In a preferred embodiment, the open slot is typically located on the top portion of the battery catcher 50.

Figure 2:
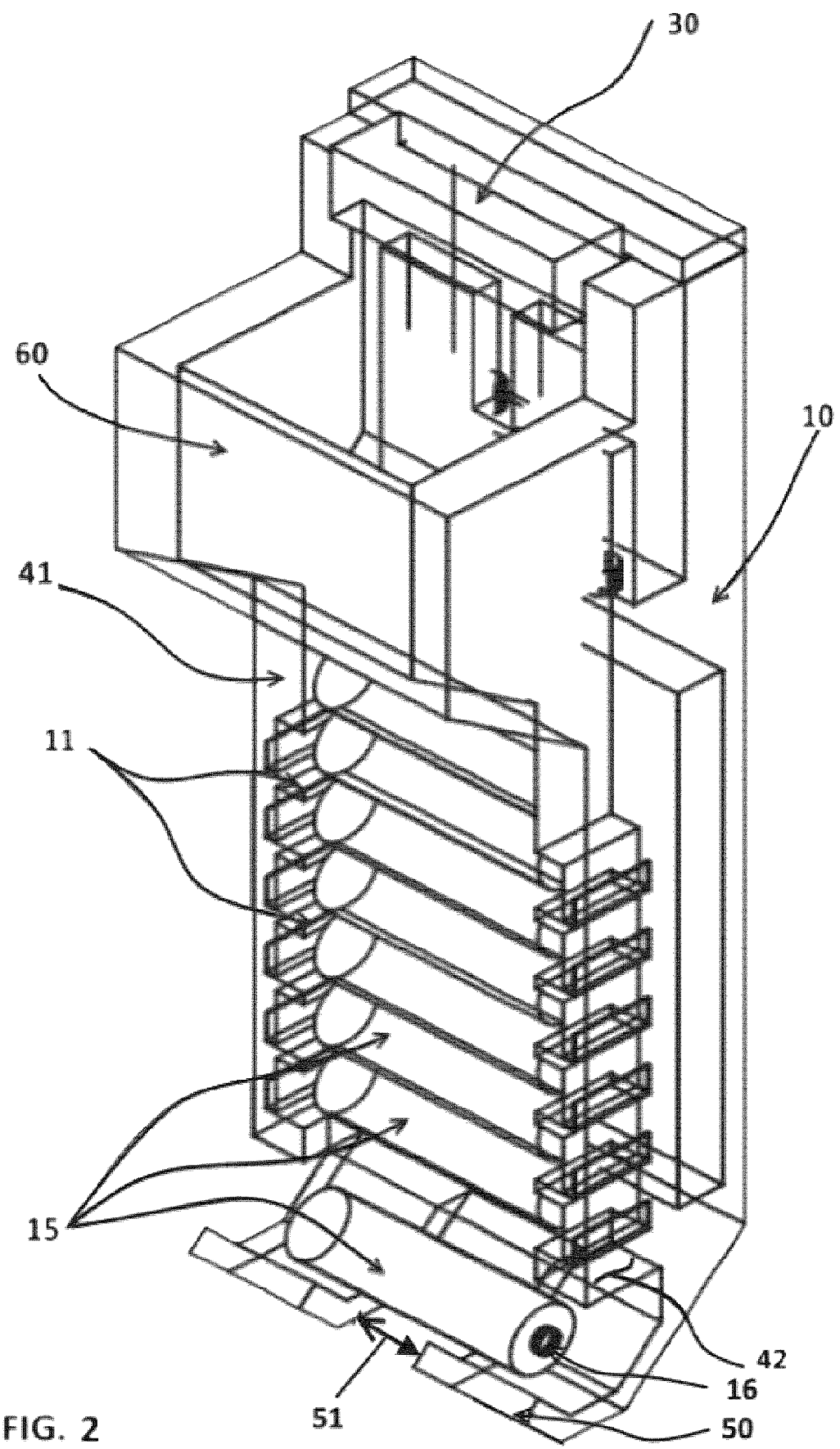
FIG. 2 is a perspective view of the inner portion of the battery charger device of FIG. 1.
Figure 3:
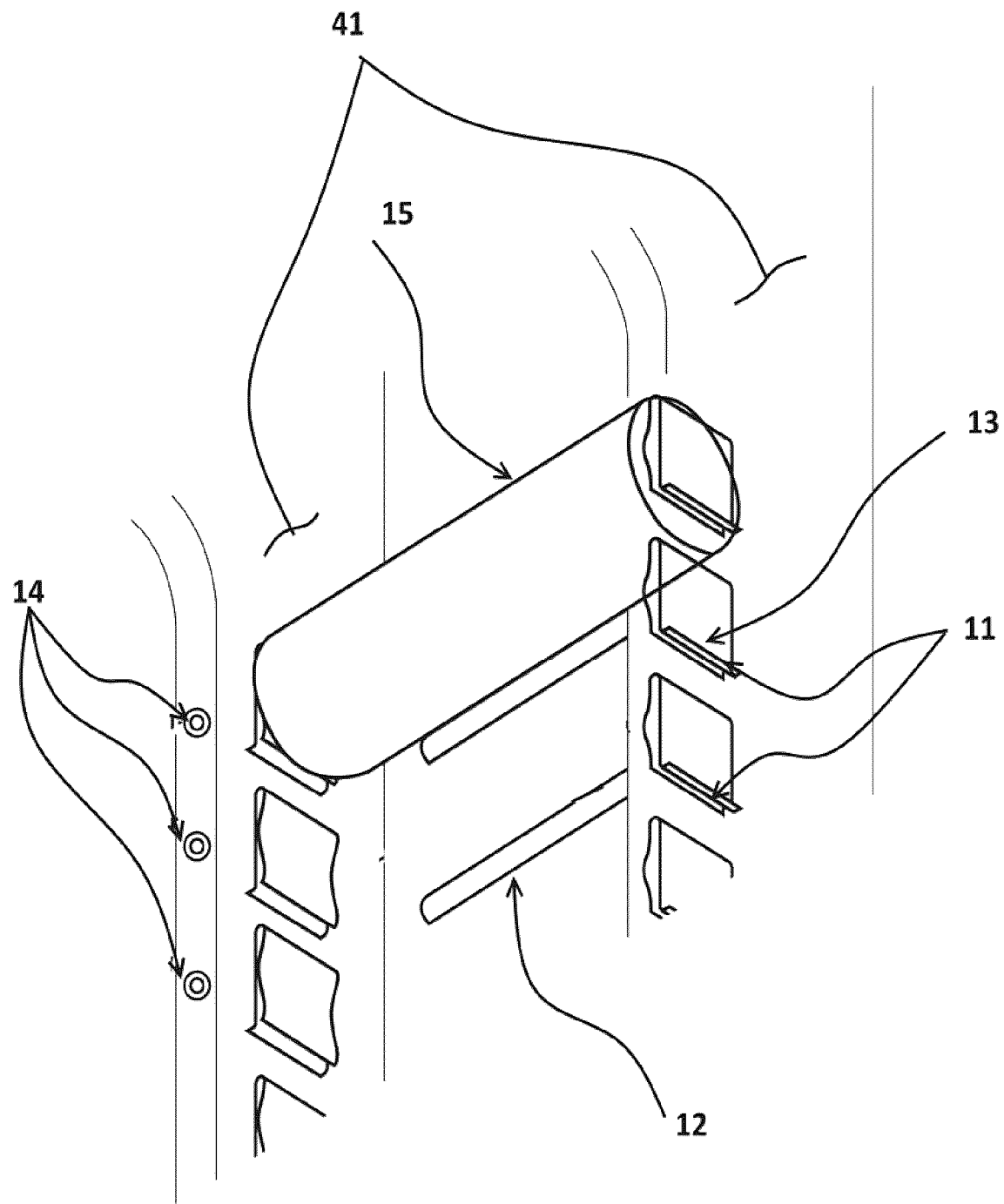
FIG. 3 is a perspective schematic view of an inner portion of the housing of the battery charger device in accordance with the principles of the present invention.

Now referring to FIGS. 2 and 3, the inner portion or charging compartment 40 of the charging device 100 is shown. The charging compartment 40 comprises charging stations 13 for batteries. Each station 13 comprises a charging terminal, also referred to as connector or retainer, 11 matching the terminal 16 of the charging battery 15. Each station 13 is typically shaped to match the type of the battery to be charged. As an example, the charging device 10 shown in FIG. 2 comprises stations 13 adapted to receive AA or AAA type batteries. In other embodiments, the station 13 may be shaped to receive C or D type batteries or even 9-volt type batteries. It should be understood that the present invention is not limited to any particular shape of batteries.

Understandably, any type of charging system may be used in a station 13 without departing from the principles of the present disclosure. As an example, typical chargers providing constant current or smart chargers automatically stopping when batteries are charged may be used.

Each station 13 comprises at least two charging terminals 11 adapted to provide current/voltage to the batteries to be charged 15. Each charging terminal 11 is made of conductive material and is configured to provide a resilient force sufficient to hold batteries during the charging process but adapted to release the battery when a discharged battery is pushed by the slider 30 on battery to be charged. Between each two successive stations 13, a strip 12, typically made of metal, helps the charging terminal 11 to keep batteries in place.

In a preferred embodiment, the charging terminal 11 are metal retainers.

In some embodiments, the charging device 100 may further comprise one or more indicator lights 14 adapted to display the state of the charging process. Understandably, each station 13 may comprise an indicator light 14 to show the charging status of each battery being charged.

In yet other embodiments, the charging device 100 may be connected to a network through a communication mean, such as a network adapter, a wireless network adapter or a mobile adapter. In such an embodiment, the charging device would comprise a controller unit, such as CPU and a memory unit, configured to communicate the state of the charging process and/or the state of charging of each charging station 13 to a client device, such as a mobile device, a computer, a tablet, etc, using the communication mean. The controller unit may be further configured or programmed to allow a client device to control the charging device upon reception of a request comprising the command to be executed. As an example, the command may comprise suspending, stopping or starting the charging process. A command might further comprise requesting the status of the charging process and other statistic of previous charges.

In other embodiments, the charging compartment 40 could also be adapted to be replaceable with another similar charging compartment 40 adapted to charge another type of batteries. As an example, the charging device 100 may comprise two charging compartment 40, one for charging AA batteries and the other for charging C batteries. In such an example, the charging compartment 40 for AA batteries would comprise more stations than the charging compartment 40 for C batteries as the AA batteries are substantially smaller than the C batteries. In such embodiments, the charging compartments 40 may comprise terminal or sockets (not shown) to quickly mount the charging compartment 40 to the charging device 100.

In a preferred embodiment, once a battery is inserted into the storing compartment 60, through the aperture 20, the slider 30 may be activated by downwardly pushing the handle. The activation of the slider 30 places a bottom portion of the slider in contact with a battery in the storing compartment 60. The movement of the slider 30 pushes the said battery down from the storing compartment 60 into the most upper charging station 13 of the charging compartment 40. As the movement of the slider is limited, the movement of the battery shall not move more than the height of one charging station. The charging terminals 11 and optionally the strip 12 limits or stops the movement of the battery to allow maintaining said battery in the charging station 13. When a second battery is present in the storing compartment 60, the slider 30 exerts a force sufficient to guide the said second battery in a passageway above the upper most charging station 13 of the charging compartment 40. When the slider 30 is activated a second time, the second battery is moved towards the uppermost charging station 13, thus pushing on the first battery present in the uppermost charging station 13 toward the next charging station 13. The movement of the first battery is guided by the guiding wall 41 to the next charging station 13. The said procedure may be repeated until all charging stations 13 contain batteries. When a battery is present in a lowermost charging station, the force exerted by the slider 30, induces the ejection of the battery from the said lowermost charging station. In a preferred embodiment, the battery catcher 50 receives the charged battery.

In embodiments where the aperture 20 is shaped as the type of battery to be inserted, the battery must be aligned to correspond with the shape of the aperture prior to inserting the said battery through the aperture within the storing compartment.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

What is claimed is:

1. A battery charger adapted to simultaneously store and charge batteries, the charger comprising:
   an upstanding housing, the housing comprising an aperture adapted to receive batteries;
   a charging compartment comprising a plurality of side by side charging stations, each of the charging stations being configured to simultaneously provide current to all batteries held in any of the charging stations;
   a battery storing compartment in communication with the aperture and the charging compartment;
   a guiding wall adapted to guide one or more batteries present in the charging stations to slide down along the charging compartment;
   a resilient member having a rest mode and a pushing mode, when in the pushing mode, the resilient member is downwardly pushing at least one battery present in the battery storing compartment in the charging compartment and displacing any battery present in the charger compartment to the next below charging station and/or to a battery receiving portion;
   wherein each charging station is configured to provide a resilient force sufficient for a battery present to be held in the charging station when the resilient member is in the rest mode and is configured to release the held battery when a battery present in the battery storing compartment is pushed toward an uppermost charging station by the resilient member.

2. The battery charger according to claim 1, wherein each charging station comprises charging terminals adapted to provide current to the batteries and each charging station is configured to reinforce holding of batteries.

3. The battery charger according to claim 2, wherein each charging terminal is made of conductive material and is configured to provide a resilient force sufficient to hold batteries during the charging process but adapted to release the held battery when the resilient member is in pushing mode.

4. The battery charger according to claim 1, wherein the battery charger further comprises an indicator means for indicating charging status of the battery charger.

5. The battery charger according to claim 1, wherein the battery charger further comprises an indicator means for indicating charging status of each charging station.

6. The battery charger according to claim 4, wherein the indicator means is a light.

7. The battery charger according to claim 1, wherein the aperture is on top of the housing.

8. The battery charger according to claim 1, wherein the aperture is shaped according to the shape of the type of battery to be inserted.

9. The battery charger according to claim 1, wherein a door covers the aperture.

10. The battery charger according to claim 9, wherein the door is resiliently mounted to the aperture.

11. The battery charger according to claim 1, wherein the storing compartment comprises an upper portion and a lower portion, the upper portion being adapted to store a plurality of batteries and the lower portion being configured to receive only one battery.

12. The battery charger according to claim 1, the housing comprising a back wall, the back wall comprising at least a resilient battery holder in between two charging stations, the resilient battery holder being adapted to hold a battery within the charging station and to flex and allow movement of a battery in an adjacent charging station being downwardly pushed.

13. The battery charger according to claim 1, wherein the charger further comprises communication means adapted to communicate with a network and a controller adapted to send status of the charging process to client device in communication with the charger.

14. The battery charger according to claim 1, wherein the guiding wall further comprises an aperture adapted to access the charging stations.

15. The battery charger according to claim 1, the resilient member being compressed in the pushing mode and being uncompressed in the rest mode.

16. The battery charger according to claim 15, wherein the resilient member comprises a protrusion adapted to be received by guide rails of the housing.

17. The battery charger according to claim 15, the resilient member comprising a handle and a spring attached to the handle and to the housing, the handle comprising a bottom portion adapted to push a battery present in the storing compartment to the top charging station of the charging compartment, the spring being in compression when the handle is in pushing mode.

18. The battery charger according to claim 17, the housing comprising a cavity adapted to receive the handle and to limit the vertical movement of the handle.

19. A method for storing, charging and dispensing batteries, the method comprising:
inserting a battery to be charged in an top aperture of a storing compartment of a charging device;
compressing a resilient member of the charger to downwardly move a battery present in the storing compartment to an upper most charging station of a charging compartment through a passage portion in-between the storing compartment and the charging compartment, the charging compartment comprising a plurality of charging stations being vertically aligned and providing a resilient force sufficient to hold a battery present in the charging station during the charging process and configured to release the battery when a battery present in the battery storing compartment is pushed by the resilient member, the resilient member being configured to provide a force sufficient to release all batteries present in the charging stations;
repeating the compression of the resilient member for other batteries present in the storing compartment;
simultaneously charging the batteries present in the charging stations; and
the compression of the resilient member ejecting a battery present in the lowermost charging station.

20. The method according to claim 19, ejecting the battery presents in the lowermost charging station further comprising receiving the ejected battery by a receiving portion under the lowermost charging station.

21. The method according to claim 19, wherein the aperture is shaped as the type of battery to be inserted, the method further comprising aligning the battery with the shape of the aperture.

22. The method according to claim 19, wherein the method further comprises communicating status of the charging device to at least one device in communication with the charging device.

* * * * *